July 7, 1936.  E. T. SHAW  2,046,346

POWER TRANSMISSION MECHANISM

Filed Feb. 18, 1935  4 Sheets-Sheet 1

Inventor

Edward T. Shaw

July 7, 1936.  E. T. SHAW  2,046,346

POWER TRANSMISSION MECHANISM

Filed Feb. 18, 1935  4 Sheets-Sheet 2

Inventor
Edward T. Shaw

Attorneys

July 7, 1936.  E. T. SHAW  2,046,346
POWER TRANSMISSION MECHANISM
Filed Feb. 18, 1935    4 Sheets-Sheet 3
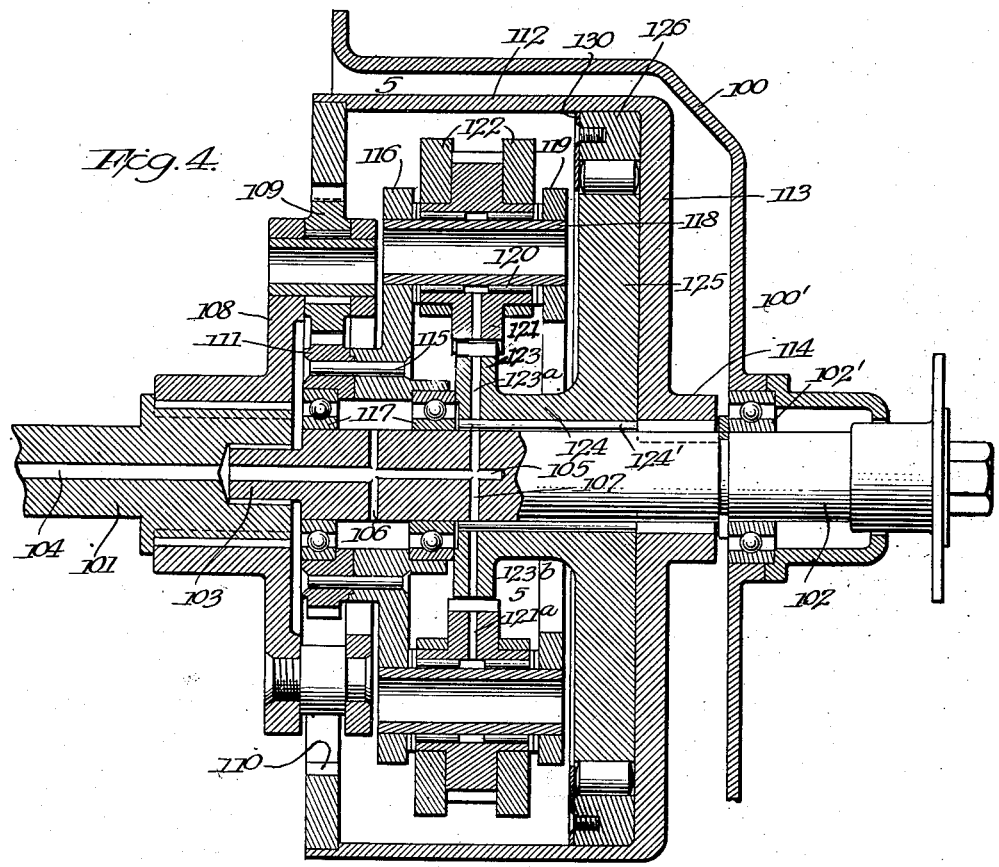
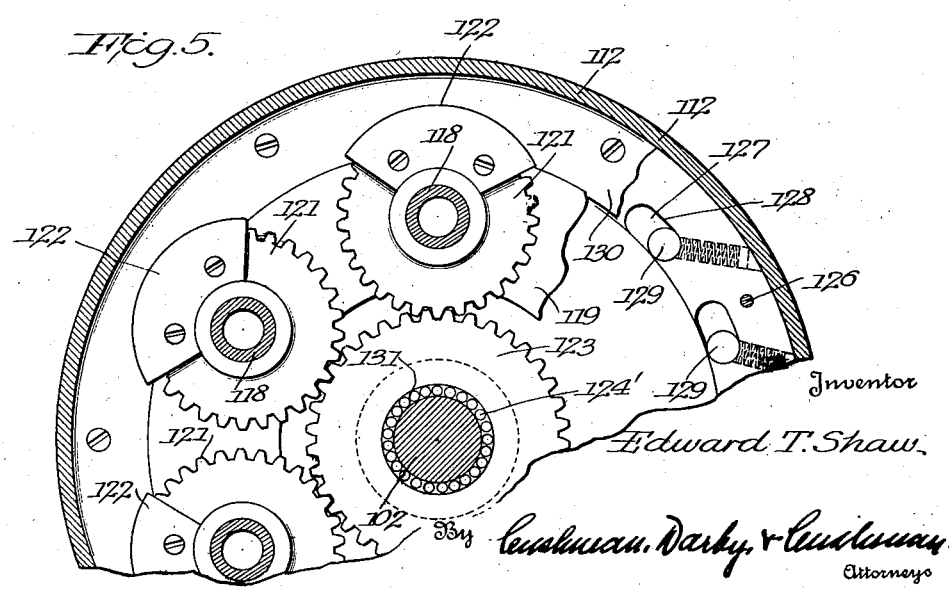
Inventor
Edward T. Shaw
By Cushman, Darby, & Cushman
Attorneys July 7, 1936.  E. T. SHAW  2,046,346
POWER TRANSMISSION MECHANISM
Filed Feb. 18, 1935  4 Sheets-Sheet 4
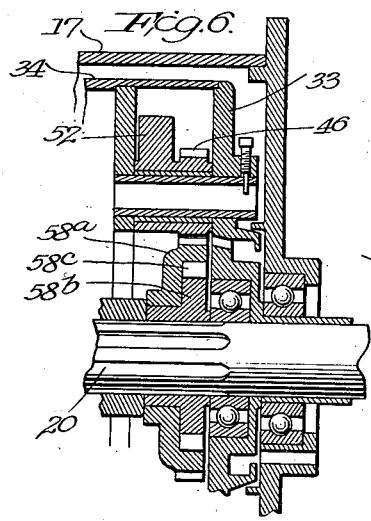
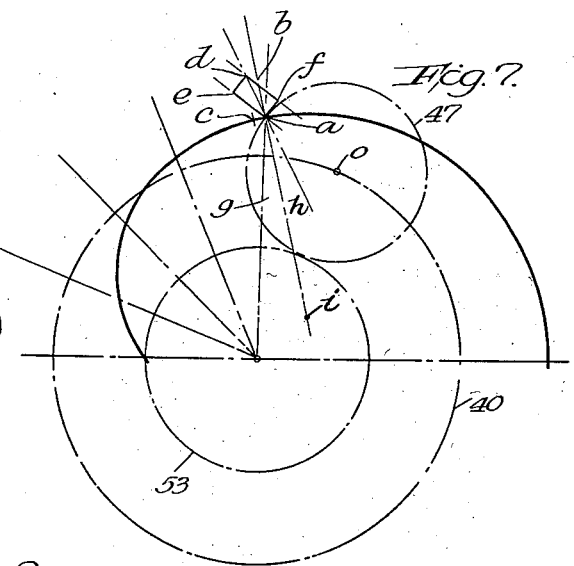
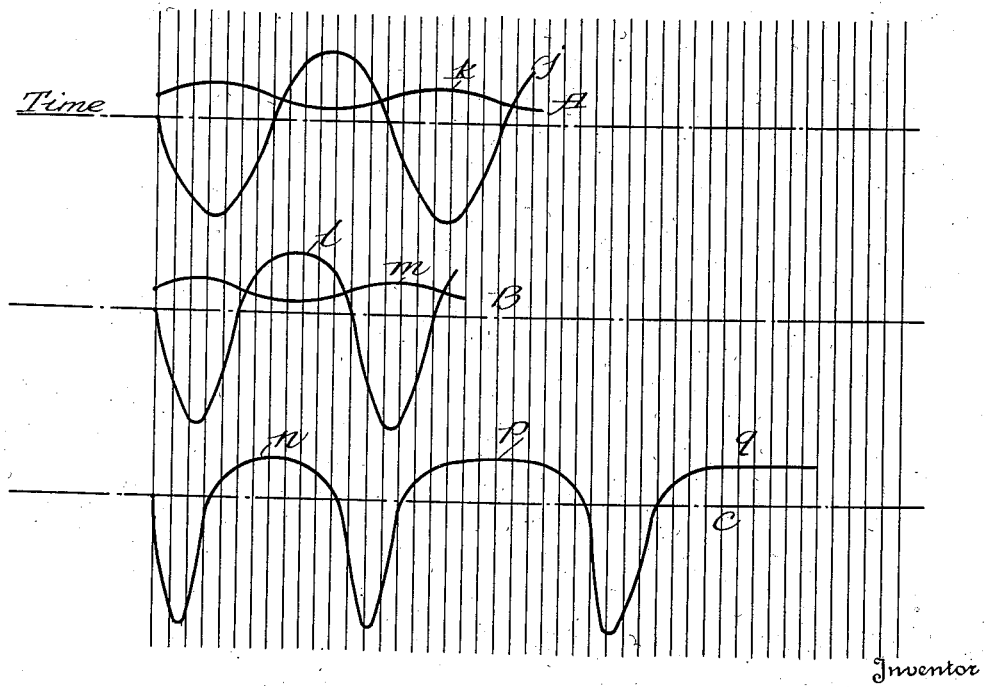
Inventor
Edward T. Shaw
By Cushman, Darby & Cushman
Attorneys Patented July 7, 1936

2,046,346

UNITED STATES PATENT OFFICE 2,046,346

POWER TRANSMISSION MECHANISM

Edward T. Shaw, Pittsfield, Mass.

Application February 18, 1935, Serial No. 7,119

30 Claims. (Cl. 74—260)

The present invention relates to mechanism including a torque converter for the transmission of power from one rotary element to another. The mechanism of the invention is particularly applicable to use in automotive vehicles but is not limited in this respect and may be favorably used wherever power is to be applied under variable conditions of load and speed.

While the invention may be practiced with the use of torque converters of various types, I prefer to use such an element of the centrifugal type due to its ready adaptability and compactness. I have accordingly shown such devices in the accompanying drawings with reference to which the invention will be described, this disclosure to be taken as merely illustrative of a general conception susceptible of varied embodiment so far as the transmission system as a whole is concerned. Specifically, however, the invention also includes torque converters per se.

This application is a continuation in part of my application Serial No. 606,989, filed April 22, 1932.

In the drawings,

Figure 4 is an axial section of a modified form of apparatus;

Figure 5 is a transverse section of the apparatus of Figure 4;

Figure 6 is a partial axial section of the apparatus of Figure 1 modified by the inclusion of an overrunning clutch; and Figures 7 and 8 are diagrams is analysis of the type of torque converter herein specifically disclosed.

Figure 1:
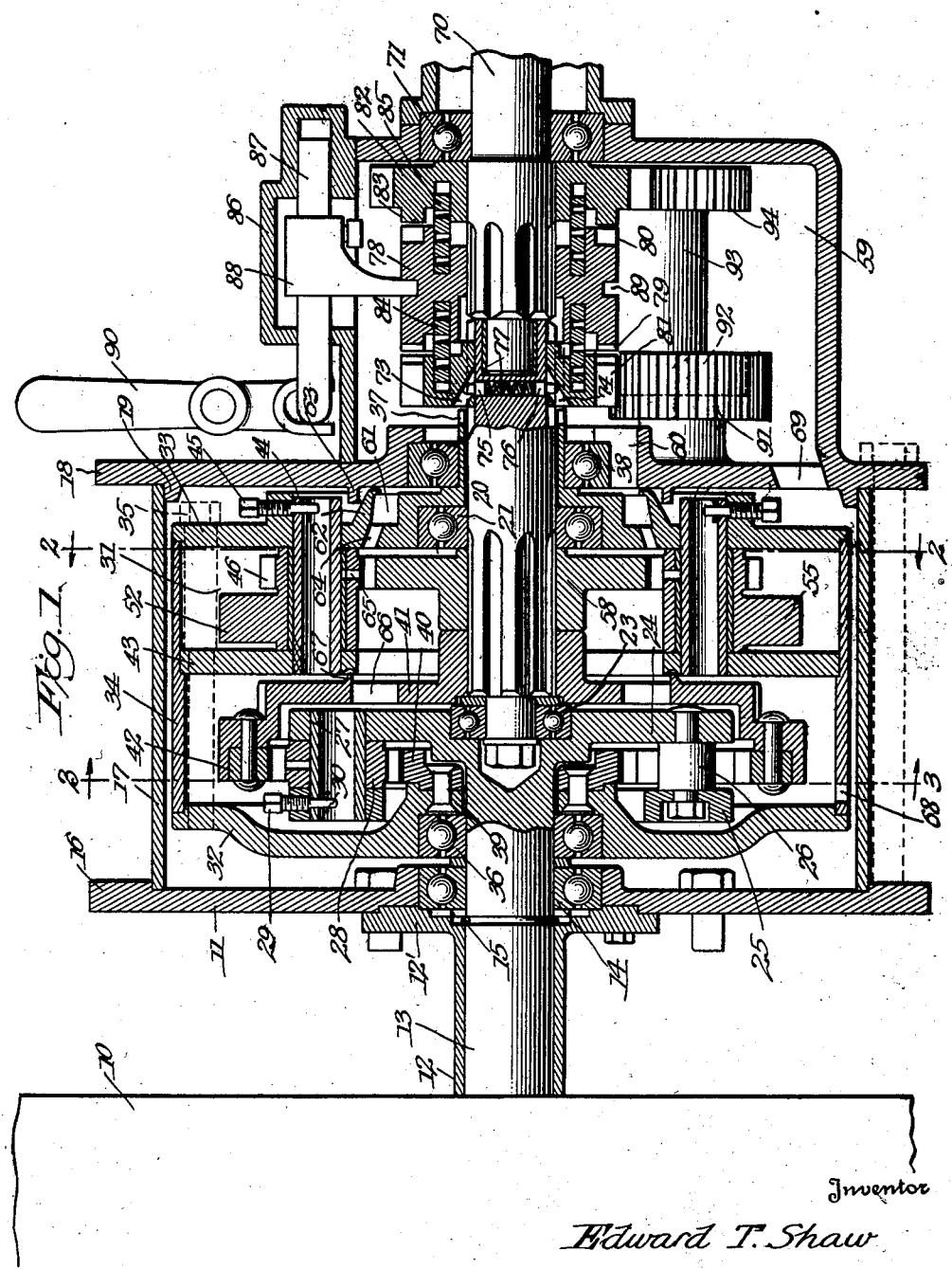
Figure 1 is a sectional view of the mechanism of the invention shown connected between an engine drive shaft and a driven shaft.

Referring to the drawings, reference numeral 10 designates an engine flywheel fixed on an engine drive shaft 13, the end of the latter passing through an aperture in a plate 11 and being supported by a ball bearing assembly 14 carried by the plate. A sleeve 12 surrounds the drive shaft between the flywheel 10 and plate 11 and is secured to the latter through a radially flanged portion 12' which abuts the outer race of the bearing assembly to assist in positioning the same. Suitable packing is provided as at 15.

On its side opposite the flywheel the plate 11 is provided with an annular shoulder 16 concentric with shaft 13, the shoulder constituting positioning means for a cylindrical housing element 17, the other end of which is closed by a plate 18 parallel to plate 11 and provided with a rib 19 engaging the inner marginal portion of element 17. These parts are suitably bolted together to provide a rigid unit. A driven shaft 20 is supported by a ball bearing assembly 21, mounted as will be later described, the rear end of the shaft extending through an aperture provided in a boss 22 of cover plate 18, the rear end of shaft 13 being bored and counter-bored so as to accommodate the forward end of shaft 20 in a ball bearing assembly 23, the shafts being in alignment.

Figure 3:
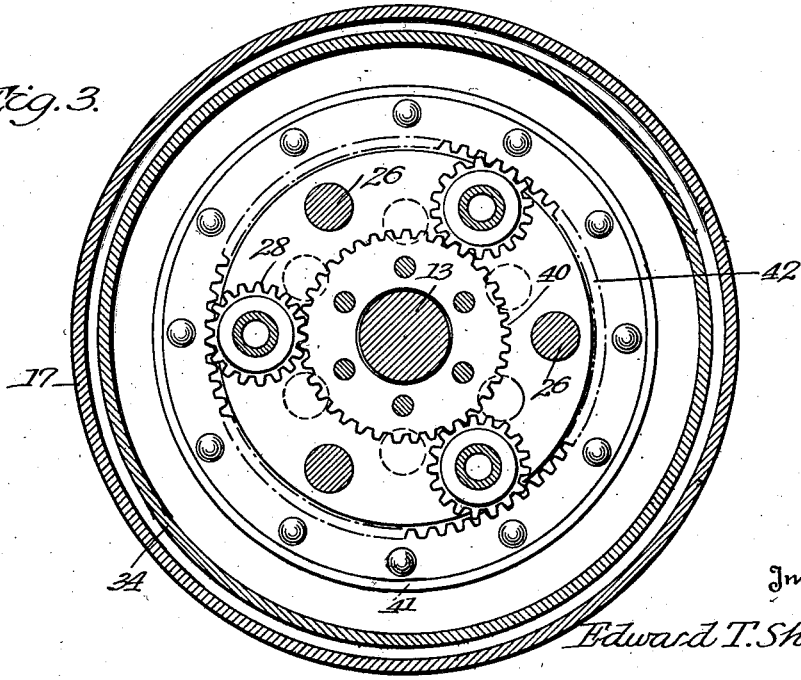
Figure 3 is a section on line 3—3 of Figure 1.

The end of shaft 13 is also radially expanded to provide a flange 24. Bolted to flange 24 adjacent its outer edge by means of spacer bolts 26 is a ring 25, Figures 1 and 3. At one hundred and twenty degree intervals the ring and flange are provided with aligned bores parallel to shaft 13, the bores receiving hollow shafts 27 on the intermediate portions of which, between the flange and ring, are mounted planet pinions 28. Locking pins 29 are threaded in radial bores in ring 25, the lower ends of the pins passing through bores in shafts 27 so as to retain the shafts in position. Cotter pins as at 30 are passed through the inner ends of pins 29 within the shafts to secure the pins against loss.

Rotatable within the housing defined by plates 11 and 18 and cylindrical element 17 is a centrifugal cage or housing designated generally by the reference numeral 31. The cage 31 comprises spaced end plates 32 and 33 between which is clamped a cylindrical peripheral wall element 34 by means of bolts as at 35. Wall 32 is provided with a suitable seat for a ball bearing assembly 36 by which it is supported on the end of shaft 13 behind flange 24 and in spaced relation thereto. Wall 33 is recessed to provide a seat for the ball bearing assembly 21 and has an integral sleeve 37 journaled in a ball bearing assembly 38 seated in a recess in boss 22, the outer end of the sleeve projecting through the boss aperture. Suitable clearance is provided between shaft 20 and the inner surface of the sleeve.

Riveted to a flange portion 39 of plate 32 is an externally toothed ring gear 40 which constitutes a sun gear engaging the planet pinions 28. A plate or web 41 having a hub portion fixed on shaft 20 supports an internally toothed ring gear 42 constituting an orbit gear engaging the planet pinions 28.

Figure 2:
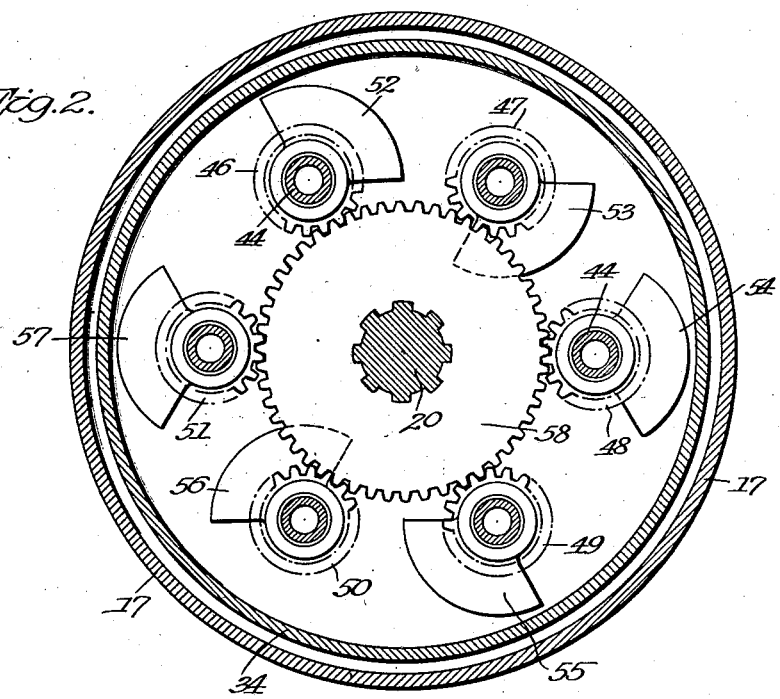
Figure 2 is a section on line 2—2 of Figure 1.

An annular plate 43 is disposed within the cage 31 between plate or web 41 and end plate 33 in circumferential contact with the inner surface of cylindrical element 34 and fixed to the latter in radial relation to shaft 20. The annulus 43 and end plate 33 are provided at sixty degree intervals, as here shown, with aligned bores in which are received shafts 44 secured in position by means of locking pins 45. Rotatable on shafts 44 between the supporting elements are planet pinions 46 to 51, the pinions as here shown having eccentric segment shaped weights 52 to 57 formed integrally therewith. Referring particularly to Figure 2, it will be noted that the diametrically opposed pairs of weights are in opposite angular relation to their respective axes. That is to say, assuming that weight 54, for example, is in a position at ninety degrees to the vertical, weight 57 is at two hundred and seventy degrees to the vertical. So far as the centrifugal cycles of the opposite weights are concerned, however, the weights are in equiphase relation and their effects are cumulative. On the other hand, the various pairs of weights are in what may be termed vari-phase relation to each other as regards their centrifugal cycles. As shown in Figure 2, weights 52 and 55 are assumed to be moving inwardly, weights 53 and 56 are in advance of the angular positions of weights 52 and 55 relative to their axes, and weights 54 and 57 are at maximum projection. The weights, taken as a whole, thus do not have the cumulative effect which they would have if they were in equi-phase relation, nor is the effect entirely balanced. The phase relation of the weights 52 to 57 is maintained through engagement of pinions 46 to 51 with a gear 56 having a boss fixed on shaft 20.

Assuming drive to be imparted to shaft 13 with shaft 20 connected to a load at standstill, planets 28 will travel around orbit gear 42, which is fixed to shaft 20, and will thereby rotate gear 40 and therewith the entire cage 31. Preferably gear 42 has at least twice as many teeth as gear 40, but the ratio may be varied as conditions may require. Assuming gear 42 to have exactly twice the number of teeth of gear 40; it will be evident that the latter will be rotated at three times the speed of drive shaft 13. It is evident that through the described gearing, the starting torque exerted by the centrifugal cage and weights is nine times as much as it would be if it were running at engine speed. High cage speed and augmented centrifugal effect are thus secured at low drive speeds and without racing the power device which drives shaft 13.

Under the conditions above assumed, gear 58 is also at standstill, being keyed to shaft 20, and consequently, as the cage 31 revolves, pinions 46 to 51 are caused to travel around gear 58, thus imparting rapid rotation to the weights 52 to 57. Assuming gear 58 to have forty-five teeth, and the meshing pinions to have fifteen, it follows that the weights will complete three revolutions about their axes for each revolution of cage 31. Inasmuch as the cage rotates at three times the speed of shaft 13, the weights will revolve at nine times the speed of the latter.

A certain angular rotation of the centrifugal cage would be necessary to project the weights by centrifugal force from inward radial position to outward radial positions regardless of the speed of rotation of the cage. In a given case, this angle of rotation may be eighty degrees.

Thus, considering the weights to be free swinging and not connected by means of pinions to gear 58, they would naturally move under centrifugal force from their inwardly extending radial positions to their outward radial positions in an eighty degree movement of the cage. Assuming now that the pinions, through engagement with gear 58, tend to swing the weights faster than their normal centrifugal throw, the pinions will exert a drag on gear 58 as they move from inner to outer positions. This drag is greatly increased as the weights are forced to move inwardly, and as the speed of the drive shaft 13 is increased, the reaction of the pinions becomes sufficient to initiate rotation of gear 58 to move the load.

As the speed of rotation of gear 58 approaches that of the cage, decelerated rotation of the weights ensues so that eventually the swinging tendency exerted by the pinions on the weights as they move from inner to outer positions, acts at a speed less than the speed of normal centrifugal swing of the weights so that a slight reverse tendency is exerted on gear 58. It is for the purpose of overcoming this reverse tendency and smoothing out torque pulsations that a plurality of weights in vari-phase relation are used.

Referring to Figure 2, weights 54 and 57 have just reached their positions of maximum projection and in moving to such positions may be assumed to have exerted a reverse effect on gear 58. Weights 53 and 56, however, have been moving inwardly and their reaction on gear 58 has overbalanced the reverse effect of weights 54 and 57 so that reaction on gear 58 in the driving direction has been maintained. Weights 52 and 55 have afforded a cumulative driving effort.

As the speeds of the cage and driven shaft approach uniformity, the travel of the weights approaches zero, and for each individual weight, the centrifugal force working in reverse while moving outward balances with the centrifugal force of the weight while moving inward. The acceleration forces on the weights, due to change in motion, approach zero and become negligible. On the other hand, there is no advantage in operating through a transmission with a driven shaft speed above 75% of engine speed, and while the transmission torque curve would not be sufficient, between the 75% speed point and the 100% speed point, to accelerate a heavy load up to the 100% point, a momentary interruption or reduction of power at the drive end will result in a rapid automatic adjustment of the speed of the three elements, drive shaft, driven shaft and cage, to uniformity; and the unbalanced torque pattern of the weight arrangement will, when properly adjusted in assembly, hold the three elements in uniform speed under any conditions where this may be desirable.

When engine torque and required driving torque for the lead come to a balance, shafts 13 and 20 are locked for a direct drive and will remain so unless engine torque or load is relatively rapidly varied. In the locked position of parts which gives maximum lock-in torque two of the sets of weights may be conceived as being in mutually balancing relation, while the weights of the third set are more or less projected and on the moving-in side of their cycle. In the absence of some change in relation between torque and load, the centrifugal force of these unbalanced weights will be sufficient to lock the cage to gear 58. This condition will substantially prevail, even if driving speed is gradually increased or retarded or if the load is not greatly varied.

Thus, the inherent characteristics of the centrifugal device are such that all reverse impulses are obliterated so that a smooth drive is attained up to a position where the lock-in relation of the parts is preferable. The variphase relation of the weights affords the smooth differential shaft speeds while the unbalanced relation of the weights enables lock-in relation to be achieved.

The pairs of weights are used for the sake of balance, and while three pairs have been shown as being the most desirable arrangement in a relatively confined space, this number can be varied as desired. Further, the centrifugal device as a whole could be duplicated as many times as desired with the weights of each circumferentially staggered relative to the weights of the other or others so that the power impulses would be multiplied.

From the above description, it will be seen that a divided drive is provided from the differential assembly specifically constituted by the sun, planet and orbit gearing and that this divided drive is transmitted to the driven shaft through two mutually reactive trains of which one includes the torque converter constituted by the centrifugal device 31. The differential assembly not only constitutes the means for dividing the drive, but also a means for multiplying the speed of the centrifugal device relative to the speed of the drive shaft and more markedly increasing the differential in speed between the centrifugal cage and the driven shaft.

Preferably formed integrally with plate 18 and outwardly thereof is a walled chamber 59 constituting a lubricant reservoir in communication with the interior of housing 17 through a duct 60 immediately below bearing assembly 21. Adjacent plate 18, plate 33 is provided with a laterally open annular groove 61 concentric with respect to shaft 20 and opposite the end of duct 60, the groove being partially closed by an inwardly extending radial flange 62 surrounding which is an annular guard rib 63 formed on the inside of plate 18. Ducts 64 formed in plate 33 communicate groove 61 with the region of meshing of gear 58 and its associated pinions. The pinions have longitudinally grooved bearing surfaces communicating with the exterior of the pinions through passages 65. In this manner, lubricant entering groove 61 from the reservoir is centrifugally urged through the somewhat inclined passages 64 to effectively lubricate the gear teeth as well as the pinion bearings. Excess lubricant forms a centrifugally sustained stratum between elements 33 and 43 and on the inside surface of cylindrical element 34, this stratum having a depth equal to the radial dimension of ring 43 and thus being sufficiently thick to be intercepted by the weights in their rotation. With the weights rotating at high speed, the lubricant is caused to conform more or less to their paths. At slower speeds, however, the lubricant will be engaged by the weights during their outward movement to exert a retarding effect thereon and thus increase their driving reaction on gear 58.

Lubricant escaping over ring 43 passes through apertures 66 in web 41, being guided thereto by an annular rib 67 on the web, the outer edge of this rib entering to a slight extent an annular groove formed in ring 43. Lubricant passing through aperture 66 is thrown outwardly and is guided across the teeth of gear 42 to lubricate the latter and consequently the teeth of the planet pinions and sun gear. Part of this lubricant also serves to lubricate the bearings of the planet gears 28 in the manner described with reference to planets 46 to 51. All excess lubricant is thrown from the cage through peripheral apertures 68 into housing 17 and returned to the reservoir through an aperture 69 in plate 18. A complete lubricating circuit is thus provided so that proper lubrication of all the parts is assured, the cage 31 acting as a centrifugal pump. With the parts in motion, the oil level in compartment 59 is at least up to the top of aperture 60.

The transmission line between driven shaft 20 and the vehicle wheels, assuming the mechanism to be applied to a vehicle drive, should include a clutch and reverse gearing. In Figure 1 I have shown a one way or overrunning clutch and reverse gearing disposed in the lubricant compartment 59.

A driven shaft 70, Figure 1, is journaled in a ball bearing assembly 71 supported in an opening in the rear wall of compartment 59, the forward end of shaft 70 being reduced and journaled in a bore in the rear end of shaft 20. The rear end of shaft 20 has splined thereon a gear 72 provided with two diagonal bores 73, 74 intersecting the axis of the gear. The shaft is provided with a diametrical bore in the ends of which are slidable piston elements 75 and 76 urged apart by a strong compression spring 77. The outer reduced ends of the piston project in the inner ends of bores 73 and 74 and bear against the inclined walls thereof, so that the gear is normally held in the position shown wherein the left hand edges of the inner ends of bores 73 and 74 bear against the sides of the reduced piston ends.

Splined on the end of shaft 70 is a clutch collar 78 provided with laterally projecting teeth 79 and 80, the teeth 79 being adapted to engage teeth 81 on gear 72. Freely rotatable on shaft 70 immediately to the rear of clutch collar 78 is a gear 82 provided with teeth 83 adapted to be engaged by teeth 80 of the clutch collar.

Gear 72 and clutch collar 78 are provided with registering annular grooves concentric with the axis of the shafts and in these grooves is disposed a helical spring 84. Similarly the clutch collar 78 and gear 82 are provided with registering annular grooves in which is disposed a helical spring 85. Finally gear 72 is provided with teeth not shown adapted to engage teeth 37' formed in the end of sleeve 37.

Slidably supported in the cover 86 of compartment 59 in parallel relation to shaft 70 is a rod 87 having a shipper finger 88 engaged in an annular groove 89 formed in the clutch collar. A lever 90 has a fork end engaging the angular end of rod 87 so that swinging of the lever imparts longitudinal movement to rod 87 and through finger 88 to the clutch collar.

Gear 72 engages an idler gear 91 which, in turn, engages a gear 92 fixed through a sleeve 93 to a gear 94, the latter engaging gear 82.

As shown in Figure 1, the parts are in neutral position so that while shaft 20 may be rotated, no torque is exerted on shaft 70. Through slight movement of the shipper finger to the left, the end of spring 84 is caught or jammed in the somewhat reduced end of the annular groove of gear 72, whereby the spring in expanding provides a one way driving connection between gear 72 and the clutch collar so that shaft 70 rotates with shaft 20. This connection is broken whenever shaft 70 overtakes shaft 20.

If positive drive between shaft 20 and shaft 70 is desired, the clutch collar is moved further to the left so that teeth 79 are brought into engagement with teeth 81.

In both the free wheeling and locked positions of the parts the piston elements 75 and 76 have restrained gear 72 against movement to the left. Further movement of the clutch collar, however, compresses spring 77 and brings gear 72 into engagement with teeth 37' and in this position of the parts a positive direct drive is obtained from shaft 13 to shaft 70 so that the drive is exactly the same as obtained in high gear with the conventional transmission.

Upon movement of the clutch collar 78 to the right from the position shown a free wheeling reverse drive connection is obtained through the helical clutch spring 85, the drive being through gears 72, 91, 92, 94, and 82 and clutch collar 78 so that shaft 70 is driven in reverse direction. Further movement of the clutch collar to the right results in the engagement of teeth 80 with teeth 83 so that free wheeling is eliminated.

It will be understood that suitable detent means may be provided for defining the various positions of the clutch collar and holding the same therein. It should also be mentioned that since centrifugal force varies as the square of the speed, the driving torque is very small at cranking and even idling speeds of the motor so that it is perfectly practical to start and idle the motor with the clutch means in engagement. It will also be understood that any suitable clutch means other than those shown and described may be used without departure from the invention.

The centrifugal torque converter specifically described herein is merely illustrative of a type whose torque output increases during acceleration and maintains an increased value at any maintained increased speed. It is again emphasized that the present invention is not necessarily limited to an organization including a converter of rotary or centrifugal type, a centrifugal converter having been chosen for purposes of illustration in view of its ready adaptability and compactness. A centrifugal converter, such as has been described, has a desirable predominating characteristic in that its torque output is proportional to the square of its speed of rotation. There are other usable converters having different, but satisfactory, characteristics in this respect.

The described torque converter may be easily modified to include an overrunning clutch when such provision is desirable. In order to develop high starting and accelerating torques at a minimum of speed for given size and weight, I may use such a clutch with the weighted gears associated with their sun gear in like phase.

In Figure 6, I have shown a manner in which an overrunning clutch may be added in the apparatus hereinbefore described. According to this figure the sun gear 58a is revoluble on a hub portion 58b keyed on shaft 20, rollers 58c being interposed between the two parts so that a cam and roller one way forward driving clutch is provided.

Referring to Figures 4 and 5, reference numeral 100 designates a fixed casing, reference numeral 101 a drive shaft and reference numeral 102 a coaxial driven shaft, the latter having a forward reduced extremity 103 journaled in an axial bore in the end of the drive shaft. The shafts are provided with coaxial lubricating ducts 104 and 105, these being intersected by the diametrical distributing ducts 106 and 107 in shaft 102.

A spider or disc 108 fixed on shaft 101 carries a number of planet gears 109 which are in engagement with an orbit gear 110 and sun gear 111. The orbit gear is secured within one end of a preferably cylindrical housing or cage 112, the housing at its other end having an integral transverse wall or web portion 113 with a central hub 114 keyed on shaft 102.

The sun gear 111 is in the form of a ring gear riveted as at 115 to an annular carrier body 116 so that a unit construction is afforded which is mounted on shaft 102 through the anti-friction bearing assemblies 117. Annulus 116 carries a series of tubular journal members 118 arranged on a circle concentric with the shafts. Each journal member 118 is fixed at one end in a receiving aperture in annulus 116 and at its other end in a ring 119.

The journal members 118 are equi-distantly spaced about shaft 120 and each carries, through the intermediary of needle rollers 120, a pinion 121. Each pinion carries eccentric weights 122 and engages with a sun gear 123 formed on a hub 124 which has a rotary bearing on shaft 102 through antifriction rollers 124'. Pinions 121 are so meshed with sun gear 123 that their weights are in equi-phase relation, all the weights thus traveling outwardly and inwardly together and during the same time period.

Adjacent wall 112, hub 124 has an integral circular flange 125. Outwardly of flange 125, a ring 126 is fixed in cage 112 and is provided with a series of pockets 127 having cam surfaces 128 for cooperation with spring-pressed rollers 129, the latter cooperating also with the periphery of flange 125 to provide an overrunning clutch. The rollers 129 are confined at one end by wall 113 and at the other by an annular plate 130 secured to the face of ring 126.

As the weights 122 move outwardly, a reverse impulse, i. e., an impulse in a direction opposite to the driving direction, is given to the sun gear 123. This impulse, however, is not transmitted through cam ring 126 and the cage to shaft 102 due to the declutching action of rollers 129. However, when the weights have passed their peaks, a forward impulse is given to gear 123, the rollers come into clutch action and the impulse is transmitted to shaft 102, the driven direction of the latter being indicated by the arrow 131, Figure 5.

A feature of importance is the disposition of the movable rollers 129 in pockets in ring 126 instead of in disc 125. The rollers being carried by the driven element of the clutch are not subjected to oscillatory travel with the clutch drive element 125 of the oscillating system. In the reverse arrangement, that is, with the rollers in the oscillating system, it sometimes occurs that the high frequency and inertia becomes so great that they cannot be kept in intimate contact with their cooperating surfaces with consequent loss in motion and power and occurrence of severe shock strains when the rollers reach a position where the power impulse takes hold of the load. In the preferred arrangement, as above desscribed, the rollers are not subjected to oscillatory travel and, therefore, are easily controlled.

Another favorable feature is the relatively large circumference of the driving and driven clutch elements 125 and 126, this enabling a large number of rollers 129 to be used and reducing strain on the parts.

The distributing duct 106 supplies lubricant to bearings 117 and through the forward one to the planet pinions 109 and their associated gears. Sun gear 123 has aligned radial ducts 123a and 123b aligned with duct 107 so that the teeth of sun gear 123 and of the planet pinions 121 are lubricated. The planet gears 121 have radial ducts as at 121a which are adapted to come into periodic register with ducts 123a and 123b so that lubricant will be supplied to bearings 120. Any suitable bearings may be provided for shaft 101. I have shown in Figure 4 a ball bearing assembly 102' mounted in the end wall 100' of housing 100 and supporting the forward portion of shaft 102.

Figure 7 shows the form of the curve described by the center of gravity of a weight when the weighted gear carrier is running and the sun gear is at standstill.

For each of an infinite number of ratios through which the transmission operates over its range of performance there is a similar curve, but of different proportions, which applies. These curves may be plotted graphically to scale for determining the actual path of the weight under any conditions of speed and ratio and when so plotted proper measurements taken from the curves will show values from which forces acting on the weight may be computed. For example, consider any point $a$ on the curve. The velocity at this point may be determined by measurement of the curve between equal angular distances of carrier rotation to each side of the point representing equal and known periods of time in accordance with the scale on which the curve is drawn. The center of curvature is found at $i$. The radius of curvature is $ia$. The centrifugal force computed from the above may be shown in the force diagram as $ab$. The weight is also subject to an acceleration force of positive or negative value along the curve. This acceleration may be determined by making proper measurements and the force which corresponds with the same computed and plotted as $ac$. The combination of these forces is represented by $ad$, the diagonal of the parallelogram. The resulting torque is a product of this force $ad$ times its moment arm $oh$, being the vertical distance from center $o$ to the line of the force. By repeating the above series of measurements and computations for different points along the curve, the complete performance throughout the cycle may be determined. Similar plots and calculations may be made for any speed ratio so that an accurate predetermination may be made of the physical performance characteristics of any design under any service condition.

Considering the condition with the sun gear stationary and the planet gear center traveling in clockwise direction around the same, the force $ad$ may be resolved into two components, one of which acts directly through the planet gear center. This becomes $ae$. The other component is $af$. The torque resulting from the product of $af$ times $oa$ is equal to that previously determined as the product of $oh$ times $ad$. This component $ae$ applies a load by way of the center $o$ upon the drive shaft. This gives, by reaction, an increased driving torque applied by way of the orbit gear of the differential to the load during the time when the weights are storing up energy from the engine.

During the positive, load driving, half-cycle the same diagram applies considering the rotation as anti-clockwise instead of clockwise. The force $ae$ tends to accelerate point $o$ and thereby the drive shaft resulting in a decreased drive by way of orbit gear of the differential. Figure 8 shows the result of calculation by the above described method in a complete cycle of performance for different conditions of service. Diagram A is for the condition described in detail above. Curve $j$ represents the weight forces and curve $k$ represents the corresponding reactive drive by way of the orbit gear of the differential. If the combined forces are not sufficient to overcome the load resistance the entire energy stored in the weights during the outer cycle returns to the carrier and engine during the inward cycle. If the load is being driven at reduced ratio that portion of such stored energy represented by the fraction, load speed divided by engine speed, is delivered to the load. The remainder returns, as described above, to the drive shaft.

When the operation of an overrunning clutch is considered and similar plots made, the conditions represented at diagram B, Figure 8, apply, $l$ showing the cycle of weight reactions and $m$ the resulting orbit gear reactions on the load. The narrower and sharper reverse wave below the line represents a period during which the wave forces are disconnected and the broader wave above the line represents the working stroke. The amount of reverse slip at the overrunning clutch and the angle of retardation may be controlled by varying the weight or mass of part 125, Figure 4 to suit performance specifications which may be set up in connection with any problem met. This will result in more or less distortion between the positive and negative waves. Diagram B, Figure 8, is presented only as an example.

As direct drive ratio is approached, varying cycles of performance are passed through, as suggested in diagram C, Figure 8, at $n$, $p$ and $q$ in which gradual extension of time or broadening of the wave until cyclic action ceases and continuous direct drive or lock-in results as indicated by $q$.

Once this direct drive or lock-in condition is attained it will be sustained until either reduction in speed or increase in load results in a load torque greater than can be sustained by the wave reaction at the existing speed.

It will be understood that the disclosure herein is merely illustrative of the principles of the invention and not restrictive. I do not limit myself as to specific type of torque converter nor as to other details of form and arrangement except as in the following claims.

I claim:—

1. Means for transmitting rotary motion from a drive to a driven shaft, said means comprising a differential gearing assembly receiving the drive and dividing it, two connections constituting self-contained transmission means for transmitting the divided drive to the driven shaft, and an automatically variable torque speed converter included in one of said connections, said converter comprising a rotary body, pinions rotatably carried by said body and geared to the driven shaft, and centrifugally projected weights carried by said body and influencing said pinions.

2. Means for transmitting rotary motion from a drive to a driven shaft, said means comprising a differential including planet pinions mounted in connection with the drive shaft, an orbit gear engaging the pinions and in positive driving connection with the driven shaft, a sun gear engaging the pinions and a driving train connecting the sun gear and driven shaft, said driving train including a centrifugal automatically variable torque speed converter of a type whose output increases during acceleration and maintains an increased value at any maintained increased speed and also including a terminal gear on the driven shaft separate from the differential constituted by said planet pinions and said sun and orbit gears.

3. Means for transmitting rotary motion from a drive to a driven shaft, said means comprising planet pinions mounted in connection with the drive shaft, a orbit gear engaging the pinions and in positive driving connection with the driven shaft, a sun gear engaged with the pinions, a rotary body connected to the sun gear, eccentrically weighted planet pinions carried by said body, and a gear in driving connection with the driven shaft and engaged by the last named pinions.

4. Means for transmitting rotary motion from a drive to an aligned driven shaft, said means comprising a housing into which the adjacent shaft ends project, the housing being rotatable on an axis coincident with that of the shafts, a planet carrier on the end of the drive shaft within the housing, planet pinions on said carrier, a sun gear fixed to the housing and engaging the planet pinions, an orbit gear within the housing engaging the planet pinions and in driving connection with the driven shaft, a second gear within the housing in driving connection with the driven shaft and eccentrically weighted planet pinions journaled in the housing and engaging said second gear.

5. Means for transmitting rotary motion from a drive to a coaxial driven shaft, said means comprising a member rotatable on an axis coincident with the axis of said shafts, a planet carrier driven by the drive shaft, planet pinions on said carrier, a sun gear in driving connection with said member and engaging the planet pinions, an orbit gear engaging the planet pinions and in driving connection with the driven shaft, a second gear in driving connection with the driven shaft, and eccentrically weighted planet pinions rotatably carried by said member and engaging said second gear.

6. Means for transmitting rotary motion from a drive to a driven shaft, said means comprising mutually reactive gearing trains between the shafts, one of said trains including a centrifugal automatically variable torque speed converter of a type whose torque output increases during acceleration and maintains an increased value at any maintained increased speed, said trains constituting self-contained transmission means and each train exerting a driving effort on the driven shaft, the gearing train which includes the converter having a single connection with the drive shaft, said last named gearing train extending from said single connection with the drive shaft to a terminal connection with the driven shaft, which terminal connection is separate from said single connection, the mutually reactive effect of said trains causing an increase in the speed of the converter when any speed differential of the shafts exists in favor of the drive shaft.

7. Means for transmitting rotary motion from a drive to a driven shaft, said means comprising a differential gearing assembly receiving the drive and dividing it into two paths terminating at the driven shaft, a centrifugal automatically variable torque speed converter of a type whose torque output increases during acceleration and maintains an increased value at any maintained increased speed, power transmitted along one of said paths acting directly on the driven shaft in the forward direction, said converter being interposed for power input and output in the other of said paths, said other of said paths including a terminal gear exclusive as an entity from said differential gearing assembly and by means of which the converter output is delivered to the driven shaft in the forward direction, said differential gearing assembly functioning to increase the speed of the converter when any speed differential of the shafts exists in favor of the drive shaft.

8. Means for transmitting rotary motion from a drive to a driven shaft, said means comprising a gearing train including a drive gear on the drive shaft and a driven gear on the driven shaft and between said gears an automatically variable torque speed converter of a type whose torque output increases during acceleration and maintains an increased value at any maintained increased speed, the converter having an operative connection with said drive shaft through said drive gear to receive its drive therefrom and having an operative connection with the driven shaft through said driven gear, the path between said operative connections being exclusive of connection with the drive shaft with the exception of the said connection through said drive gear, and automatically acting means for increasing the speed of the converter when any speed differential of the shafts exists in favor of the drive shaft, the converter output being delivered to said driven gear in forward driving direction.

9. Means for transmitting rotary motion from a drive to a driven shaft, said means comprising a gearing train including a drive gear on the drive shaft and a driven gear on the driven shaft and between said gears a rotary automatically variable torque speed converter of a type whose torque output increases during acceleration and maintains an increased value at any maintained increased speed, the converter having an operative connection with said drive shaft through said drive gear to receive its drive therefrom and having an operative connection with the driven shaft through said driven gear, the path between said operative connections being exclusive of connection with the drive shaft with the exception of the said connection through said drive gear, and automatically acting means for increasing the speed of the converter over that of the drive shaft when any speed differential of the shafts exists in favor of the drive shaft, the converter output being delivered to said driven gear in forward driving direction.

10. Means for transmitting rotary motion from a drive to a driven shaft, said means comprising differential gearing and a rotary automatic torque speed converter so related to the differential gearing that when the speed of the drive shaft is greater than that of the driven shaft the converter is rotated at a higher speed than that of the drive shaft, said converter being of the type whose torque output increases during acceleration and maintains an increased value at any maintained increased speed, and being interposed in a transmission line which extends from an original connection with said differential gearing to a terminal connection with the driven shaft, which terminal connection is separate from said differential gearing, the converter and differential gearing tending to equalize the speeds of the two shafts and the converter and maintain such equalization when load conditions allow.

11. Means for transmitting rotary motion from a drive to a driven shaft, said means comprising a differential gearing assembly adjacent to the drive shaft receiving and dividing the drive into separate paths each terminating in a separate element on the driven shaft, one of the paths including an automatic torque speed converter of a type whose torque output increases during acceleration and maintains an increased value at any maintained increased speed, said differential being so arranged as to increase the speed of the torque converter coincident with any reduction in speed of the driven shaft relative to that of the drive shaft.

12. Means for transmitting rotary motion from a drive to a driven shaft, said means comprising an automatically variable torque speed converter of a type whose torque output increases during acceleration and maintaining an increased value at any maintained increased speed, a gearing train whereby said converter receives its input from the drive shaft and delivers its output to the driven shaft, and another gearing train between the drive and driven shafts exclusive of the first gearing train with the exception of an initial element which is also the initial element of said first gearing train, said gearing trains being mutually reactive through said common element to cause the converter to be driven at increased speed coincident with the occurrence of any speed differential of the shafts in favor of the drive shaft.

13. Means for transmitting rotary motion from a drive to a driven shaft, said means comprising a differential assembly including pinions carried by the drive shaft for revolution therewith and rotation about their own axes and a pair of gears in coaxial relation with said drive shaft and engaging said pinions, one of said gears being in positive driving connection with the driven shaft, a torque converter of a type whose torque output increases during acceleration and maintains an increased value at any maintained increased speed, said converter being driven from the other of said gears, and a gear on the driven shaft receiving the converter output.

14. Means for transmitting rotary motion from a drive to a driven shaft, said means comprising a differential assembly including pinions carried by the drive shaft for revolution therewith and rotation about their own axes and a pair of gears in coaxial relation with said drive shaft and engaging said pinions, one of said gears being mounted on the driven shaft in driving relation thereto, a rotary body driven by the other of said gears, eccentrically weighted planet pinions carried by said body, and a gear on the driven shaft in driving relation thereto and engaged by said planet pinions.

15. Means for transmitting rotary motion from a drive to a driven shaft, said means comprising planet pinions mounted in connection with the drive shaft, an orbit gear engaging the pinions and in positive driving connection with the driven shaft, a sun gear engaging the pinions, and a driving train connecting the sun gear and driven shaft, said driving train including an automatically variable torque speed converter of a type whose output increases during acceleration and maintains an increased value at any maintained increased speed and also including a terminal gear on the driven shaft separate from the differential constituted by said planet pinions and said sun and orbit gears.

16. Means for transmitting rotary motion from a drive to a driven shaft, said means comprising gearing trains between the shafts, one of said trains including an automatically variable torque speed converter of a type whose torque output increases during acceleration and maintains an increased value at any maintained increased speed, said trains constituting self-contained transmission means and each train exerting a driving effort on the driven shaft, the gearing train which includes the converter having a single connection with the drive shaft, said last named gearing train extending from said single connection with the drive shaft to a terminal connection with the driven shaft that is separate from said single connection, said trains including means for increasing the speed of the converter coincident with any reduction in speed of the driven shaft relative to that of the drive shaft.

17. Means for transmitting rotary motion from a drive to a driven shaft, said means comprising a differential gearing assembly receiving the drive and dividing it, two connections constituting self-contained transmission means for transmitting the divided drive to the driven shaft, and an automatically variable torque speed converter included in one of said connections, said converter comprising a rotary body, pinions rotatably carried by said body and geared to the driven shaft, centrifugally projected weights carried by said body and influencing said pinions, and an overrunning clutch interposed in the line of drive between said pinions and said driven shaft.

18. Means for transmitting rotary motion from a drive to a driven shaft, said means comprising planet pinions mounted in connection with the drive shaft, an orbit gear engaging the pinions and in positive driving connection with the driven shaft, a sun gear engaged with the pinions, a rotary body connected to the sun gear, eccentrically weighted planet pinions carried by said body, and a gear engaged by the last named pinions and having a driving connection with the driven shaft, said last named driving connection including an overrunnng clutch.

19. Means for transmitting rotary motion from a drive to a driven shaft, said means comprising a housing in driving connection at one end with the driven shaft, an orbit gear in driving connection with the other end of said housing, planet pinions engaging said orbit gear, a carrier for said pinions in driven connection with the drive shaft, a sun gear in rotary relation to the shafts and housing, said sun gear engaging said pinions, a body within said housing in driven connection with said sun gear, eccentrically weighted planet pinions carried by said body, a sun gear in said housing and engaging said weighted pinions, and an overrunning clutch in the line of drive between said last named sun gear and the driven shaft.

20. Means for transmitting rotary motion from a drive to a coaxial driven shaft, said means comprising a member rotatable on an axis coincident with the axis of said shafts, a planet carrier driven by the drive shaft, planet pinions on said carrier, a sun gear in driving connection with said member and engaging the planet pinions, an orbit gear engaging the planet pinions and in driving connection with the driven shaft, a second gear having a driving connection with the driven shaft, eccentrically weighted planet pinions rotatably carried by said member and engaging said second gear, said last named driving connection including an overrunning clutch.

21. Means for transmitting rotary motion from a drive to a driven shaft, said means comprising a differential assembly including pinions carried by the drive shaft for revolution therewith and rotation about their own axes and a pair of gears in coaxial relation with said drive shaft and engaging said pinions, one of said gears being mounted on the driven shaft in driving relation thereto, a rotary body driven by the other of said gears, eccentrically weighted planet pinions carried by said body, a gear on the axis of the driven shaft engaged by said weighted pinions, and an overrunning clutch between said last named gear and said driven shaft.

22. Means for transmitting rotary motion from a drive to a driven shaft, said means comprising a differential gearing assembly receiving the drive and dividing it, two connections constituting self-contained transmission means for transmitting the divided drive to the driven shaft, and an automatically variable torque speed converter included in one of said connections, said converter comprising a rotary body, pinions rotatably carried by said body and geared to the driven shaft, centrifugally projected weights carried by said body and influencing said pinions, all of said weights being in equi-phase relation with respect to each other, and an overrunning clutch interposed in the line of drive between said pinions and said driven shaft.

23. Means for transmitting rotary motion from a drive to a driven shaft, said means comprising planet pinions mounted in connection with the drive shaft, an orbit gear engaging the pinions and in positive driving connection with the driven shaft, a sun gear engaged with the pinions, a rotary body connected to the sun gear, eccentrically weighted planet pinions carried by said body, said weighted pinions being in equiphase relation with respect to each other, and a gear engaged by the last named pinions and having a driving connection with the driven shaft, said last named driving connection including an overrunning clutch.

24. Means for transmitting rotary motion from a drive to an aligned driven shaft, said means comprising a cylindrical housing arranged concentrically with said shafts and having at one end a transverse web portion mounted on and in driving connection with the driven shaft, an orbit gear in driving connection with the other end of said housing, planet pinions engaging said orbit gear, a carrier for said pinions in driven connection with the drive shaft, a sun gear rotary relative to the shafts and housing and engaging said pinions, a body within said housing in driven connection with said sun gear, eccentrically weighted planet pinions carried by said body, a sun gear rotary on the axis of said shafts and engaging said weighted pinions and maintaining the latter in equi-phase relation with respect to each other, and an overrunning clutch in the line of drive between said last named sun gear and the driven shaft.

25. Means for transmitting rotary motion from a drive to a coaxial driven shaft, said means comprising a member rotatable on an axis coincident with the axis of said shafts, a planet carrier driven by the drive shaft, planet pinions on said carrier, a sun gear in driving connection with said member and engaging the planet pinions, an orbit gear engaging the planet pinions and in driving connection with the driven shaft, a second gear having a driving connection with the driven shaft, eccentrically weighted planet pinions rotatably carried by said member and engaging said second gear, said weighted pinions being in equi-phase relation with respect to each other, said last named driving connection including an overrunning clutch.

26. Means for transmitting rotary motion from a drive to a driven shaft, said means comprising a differential assembly including pinions carried by the drive shaft for revoluton therewith and rotation about their own axes and a pair of gears in coaxial relation with said drive shaft and engaging said pinions, one of said gears being mounted on the driven shaft in driving relation thereto, a rotary body driven by the other of said gears, eccentrically weighted planet pinions carried by said body, a gear on the driven shaft in driving relation thereto and engaged by said planet pinions, said weighted pinions being in equi-phase relation with respect to each other, and an overrunning clutch between said last named gear and said driven shaft.

27. Means for transmitting rotary motion from a drive to a driven shaft, said means comprising mutually reactive gearing trains between the shafts, one of said trains including a centrifugal automatically variable torque speed converter of a type embodying a system developing positive and negative impulses and whose torque output increases during acceleration and maintains an increased value at any maintained increased speed, said trains constituting self-contained transmission means and each train exerting a driving effort on the driven shaft, the gearing train which includes the converter having a single connection with the drive shaft, said last named gearing train extending from said single connection with the drive shaft to a terminal connection with the driven shaft, which terminal connection is separate from said single connection, the mutually reactive effect of said trains causing an increase in the speed of the converter when any speed differential of the shafts exists in favor of the drive shaft, and an overrunning clutch arranged in said gearing train which includes the converter to absorb negative impulses of said system.

28. Means for transmitting rotary motion from a drive to a driven shaft, said means comprising a differential gearing assembly adjacent to the drive shaft receiving and dividing the drive into separate paths each terminating in a separate element on the driven shaft, one of the paths including an automatic torque speed converter of a type including a system developing positive and negative impulses and whose torque output increases during acceleration and maintains an increased value at any maintained increased speed, said differential being so arranged as to increase the speed of the torque converter coincident with any reduction in speed of the driven shaft relative to that of the drive shaft, and an overrunning clutch arranged in the path which includes the converter to absorb negative impulses of said system.

29. Means for transmitting rotary motion from a drive to a driven shaft, said means comprising a differential gearing assembly adjacent the drive shaft receiving and dividing the drive into separate paths each terminating on the driven shaft, one of the paths including a torque speed converter of a type whose torque capacity increases during acceleration and maintains an increased value at any maintained increased speed, said one of the paths from its starting point at the differential being exclusive of further connection with the drive shaft and the differential gearing assembly, said differential being so arranged as to increase the speed of the torque converter coincident with any reduction in speed of the driven shaft relative to that of the drive shaft.

30. Means for transmitting rotary motion from a drive to a driven shaft, said means comprising associated sun, planet and orbit gears, a carrier for the planet gearing on said drive shaft, the orbit gear being in driving connection with the driven shaft, a torque speed converter of a type whose torque capacity increases during acceleration and maintains an increased value at any maintained increased speed, a gearing train including said torque converter connecting said sun gear and said driven shaft, said gearing train from its starting point at the sun gear being exclusive of further connection with said gears and said drive shaft.

EDWARD T. SHAW.